United States Patent
Olson et al.

[11] Patent Number: 5,372,001
[45] Date of Patent: Dec. 13, 1994

[54] AQUATIC VEGETATION MOWING APPARATUS

[76] Inventors: Carl V. Olson; Diane Olson, both of 5301 Ripley La. N., Renton, Wash. 98056

[21] Appl. No.: 156,650

[22] Filed: Nov. 24, 1993

[51] Int. Cl.$^5$ .................... A01D 44/00; A01D 34/10
[52] U.S. Cl. .......................... 56/8; 56/11.9; 56/257
[58] Field of Search ............ 56/8, 9, 11.9, 257, 56/296

[56] References Cited

U.S. PATENT DOCUMENTS

| | | | |
|---|---|---|---|
| 3,477,213 | 11/1969 | Just et al. | 56/9 |
| 3,808,779 | 5/1974 | Randall | 56/9 |
| 4,885,902 | 12/1989 | Schmidt | 56/8 |
| 4,999,982 | 3/1991 | Kriger | 56/8 |

FOREIGN PATENT DOCUMENTS

| | | | |
|---|---|---|---|
| 667244 | 2/1952 | United Kingdom | 56/8 |
| 2057236 | 4/1981 | United Kingdom | 56/8 |

*Primary Examiner*—Stephen J. Novosad
*Attorney, Agent, or Firm*—Robert W. Jenny

[57] ABSTRACT

The mowing apparatus is made up of a long, narrow cutting assembly, a boat and two booms, one on each side of the boat, attaching the cutting assembly to the boat. There is a flotation tank at each end of the cutting assembly and the forward end of each tank is pivotally attached to the aft end of a boom. The forward ends of the booms are pivotally attached to the boat at about gunwale height and well toward the bow. All the pivotal connection axes are horizontal and perpendicular to the vertical plane through the centerline of the boat, allowing the cutting assembly to be raised and lowered between the surface of the water and the bottom of the body of water. The raising and lowering are done by allowing water into the tanks to cause the cutting assembly to sink and forcing the water out of the tanks with air to raise the cutting assembly. The cutting assembly is a sawtoothed blade operating between two sawtoothed plates. The end wise oscillations of the blade are powered by a pneumatic actuator. The tanks are sized and positioned to hold the cutting assembly a specific distance from the bottom when the tanks are flooded and to float the cutting assembly clear of the water when they are full of air. The bottoms of the tanks are shaped so that they plane on the water surface at relatively high boat speeds.

7 Claims, 1 Drawing Sheet

AQUATIC VEGETATION MOWING APPARATUS

BACKGROUND OF THE INVENTION

Field

The subject invention is in the field of mowers, sickle bars and particularly cutters used for cutting aquatic vegetation. More particularly it is in the field of such apparatus operable from a boat.

Prior Art

The patents listed below are a sampling of the patented prior art in the particular field noted.

| 3,477,213 | 3,808,779 |
|---|---|
| 4,885,902 | 4,999,982 |

There is a recognized need for an aquatic vegetation mower which (1) cuts a certain distance from the bottom of the body of water in which it is operated rather than a certain distance from the surface and automatically adjusts to depth changes; (2) will operate well on soft bottoms; (3) will not create currents in the water which complicate retrieving the cut-off vegetation; (4) causes a minimum of riling of the water by stirring up bottom sediment; (5) is easily brought to the surface to simplify maneuvering and positioning of the boat and cutter; and (6) can be moved to and from work areas at relatively high speed. None of the known prior art, patented or not, meets all these requirements. Accordingly, the primary objective of the subject invention is to provide aquatic vegetation mowing apparatus which does meet all these requirements. Other objectives are that the apparatus be relatively simple to manufacture and operate and that it be easily managed rather than cumbersome.

SUMMARY OF THE INVENTION

The subject invention is an aquatic vegetation mowing apparatus. A cutting assembly is mounted on a boat by two booms, one on each side of the boat. The upper (forward) ends of the booms are pivotally attached to the boat with the pivot axes horizontal and at right angles to a vertical plane through the fore and aft centerline of the boat. The lower ends of the booms are pivotally attached at the ends of the cutting assembly, also with basically horizontal pivot axes normal to a vertical plane through the centerline of the boat. The cutter comprises a flat metal bar, with a sawtooth profile in plan view and called a blade, oscillating between two plates which have sawtooth profiles generally matching that of the bar. The bar oscillation stroke is at least as long as the pitch of the saw teeth on the bar and plates and it is moved by a pneumatic actuator, i.e. a piston and piston rod in a cylinder. There is a flotation tank at each end of the cutting assembly. The tanks are positioned and shaped to hold the cutter bar/plates assembly a desired distance from the bottom with the bottoms of the tanks resting or sliding on the bottom. The tanks, actuator, plates and blade constitute the cutting assembly. The cutting assembly is lowered to the bottom by allowing the tanks to fill with water and raised by supplying air under pressure to force the water from the tanks. The booms are buoyant and their buoyancy partially overcomes the weight of the cutter assembly, the result being that the cutter assembly rests lightly on the bottom. The sum of the forces on the bottom, divided by the sum of the contact areas, is in the range 0.05 to 0.50 pounds per square inch with 0.25 p.s.i. preferred. The tanks, particularly the bottoms of the tanks, are shaped so that with the tanks fully buoyant to hold the cutter assembly raised clear of the water the tanks will plane on the water surface, facilitating high speed travel without the need for apparatus to lift the cutter assembly clear of the water. The top (forward) ends of the booms are pivoted well forward on the boat just below gunwale height. This pivot location keeps the combined length of the boat and mower apparatus short relative to the maximum feasible depth of operation of the mowing apparatus for specific boom length. The controls for raising, lowering and running the apparatus are appropriate valving to control the pressurized air supplies to the cutting assembly actuator and the flotation tanks.

The invention is described in more detail below with reference to the attached drawings.

DETAILED DESCRIPTION OF THE INVENTION

The subject invention is aquatic vegetation mowing apparatus used on a boat. The way in which the apparatus is mounted on the boat is important to optimum function of the apparatus and therefore the boat is considered to be part of the apparatus.

Figure 1:
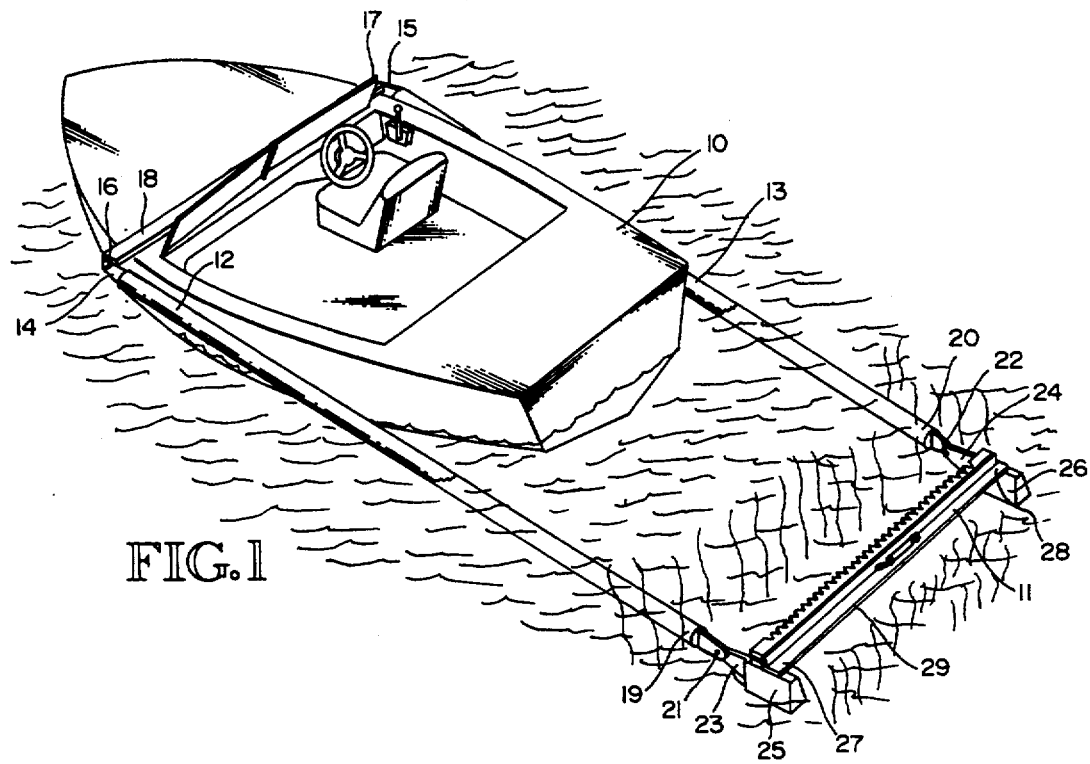
FIG. 1 is a perspective view of the subject invention installed on a boat and ready for operation.
Figure 2:
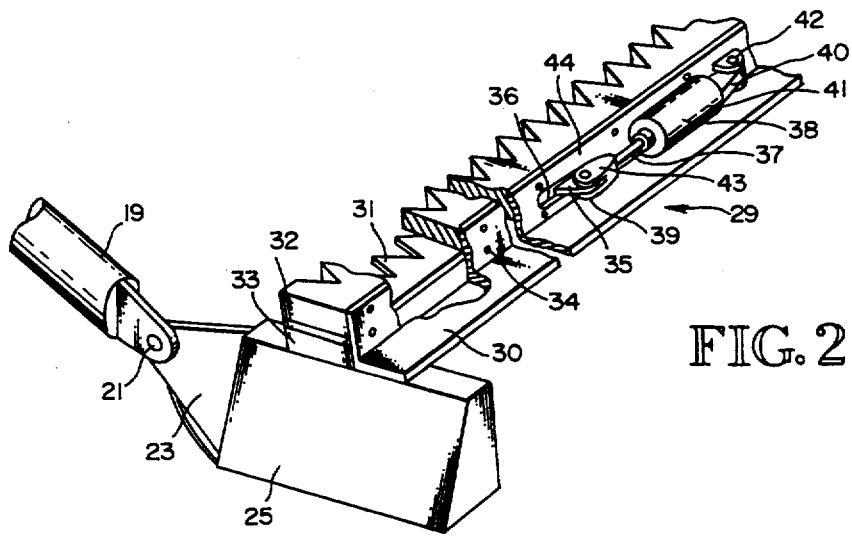
FIG. 2 is an enlarged partially sectioned view of the portion of the cutting assembly encircled in FIG. 1.

The apparatus is shown in FIG. 1 ready for operation and comprises boat 10 and cutting assembly 11 attached to the boat by booms 12 and 13. The forward ends 14 and 15 of the booms are pivoted on ends 16 and 17 of beam 18, the pivot axes being horizontal and perpendicular to a vertical plane through the longitudinal centerline of the boat. The aft ends 19 and 20 of the booms are pivotally attached at 21 and 22 to the forward ends 23 and 24 of flotation tanks 25 and 26. The equal lengths of the booms exceed the length of the boat by an amount in the range of 10 to 50 percent of the boat length. The tanks are attached at the ends 27 and 28 of the cutting assembly. The tanks are configured to hold the cutting assembly a distance d from the bottom with the apparatus in the cutting mode. Cutter sub-assembly 29 comprises beam 30 and sawtoothed blade 31 held between sawtoothed plates 32 and 33 so that the broad flat surfaces of the blade are held against the broad flat surfaces of the plates and the sawtoothed edges of the blade and plates face in the forward direction of the boat. The blade slides laterally between the plates which are fastened to the beam with threaded fasteners, fastener 34 being typical. Tongue 35 extends from the blade through slot 36 in the beam. Piston rod 37 of actuator 38 is pivotally connected to end 39 of the tongue. End 40 of cylinder 41 of the actuator is pivoted to bracket 42 which extends from the beam. The blade is retained in the fore and aft direction between the plates by interference between clevis 43 on the piston rod and the back surface 44 of the beam.

An air compressor is carried aboard the boat to provide air under pressure to operate the actuator and to control the buoyancy of the tanks. Hoses, not shown in the drawings, lead from a port in the top of each tank to appropriate control valves in the boat. Operating the valves to open the tanks to atmosphere allows the tanks to fill and sink. Operating the valves to provide air under pressure to the tanks drives the water from the tanks and causes them to float, lifting the cutting assembly to the surface of the water with the blade and plates clear of the water. A valve controlled by a pneumatic logic circuit is used to activate the actuator. The design of such control apparatus for providing and controlling the air to operate the mowing apparatus is known to be well within the capabilities of persons of ordinary skill in the art and the details of such design are included in the subject application to the extent needed to describe how to make and use the invention.

The procedure for standard use of the mowing apparatus including the boat are: 1) position the apparatus to cut a swath of vegetation; 2) lower the cutting assembly; 3) activate the cutting assembly and move the apparatus forward to cut the swath; 4) stop the cutting assembly; 5) blow the tanks to raise the cutting assembly; and 6) reposition the apparatus for the next cut.

It is considered to be understandable from this description that the subject invention meets its objectives. It cuts vegetation at a certain distance from the bottom of the body of water. The buoyancy of the booms and cutting assembly support most of their weight so that the forces of the tank bottoms on the bottom are minimal. Passage of the booms and cutting assembly causes only minimal disturbance of the water, keeping contamination to a minimum and facilitating retrieval of the cut vegetation. No apparatus is needed specifically for raising and lowering the cutting assembly, reducing cost and complication of the apparatus as well as keeping it from becoming cumbersome. The ability of the tanks to plane on the water surface facilitates movement to and from work areas.

It is also considered to be understood that while one embodiment of the invention is described herein, other embodiments and modifications of the one described are possible within the scope of the invention which is limited only by the attached claims.

I claim:

1. Aquatic vegetation mowing apparatus being movable in a forward direction and operable on a body of water having a surface and a bottom with vegetation growing from it, said apparatus comprising:

a boat having a longitudinal centerline, a boat length, a gunwale, and a forward section, a cutting assembly having first and second ends and operating a distance above said bottom, first and second booms having equal boom lengths, and each having forward and aft boom ends, four pivotal connections, each having an axis, said axes being horizontal and perpendicular to a vertical plane through said centerline, said forward ends of said booms each being attached by one of said pivotal connections to said boat near said gunwale, said cutting assembly further comprising first and second flotation tanks each having a forward end, said first tank being at said first end of said cutting assembly, and said second tank being at said second end of said cutting assembly, said aft end of said first boom being attached by a third of said pivotal connections to said forward end of said first tank, said aft end of said second boom being attached by a fourth of said pivotal connections to said forward end of said second tank, said cutting assembly comprising at least one plate having a first sawtoothed edge and a blade having a second sawtoothed edge, said at least one plate extending from said first end to said second end of said cutting assembly, said at least one plate having a first broad surface, said blade having a second broad surface, said at least one plate and said plate being positioned with said first and second broad surfaces in contact, said cutting assembly further comprising (1) means for holding said first and second broad surfaces in contact with said first and second sawtoothed edges overlaying each other and directed in said forward direction and (2) means for oscillating said blade end wise relative to said plate, said apparatus further comprising means for activating said means for oscillating, said apparatus further comprising means for filling said tanks with said water and for emptying said tanks, whereby said cutting assembly can be lowered to said bottom by filling said tanks and caused to rise clear of said water by emptying said tanks, said tanks, each having a bottom area and being configured to hold said cutting assembly said distance from said bottom and to be able to plane on said surface, whereby when said apparatus is moved in said forward direction and said blade is oscillating said vegetation growing from said bottom is mowed.

2. The apparatus of claim 1 in which said first and second booms have first and second weights and first and second buoyant forces, said cutting assembly has a third weight and a third buoyant force and said first and second tanks have fourth and fifth weights and buoyant forces when said tanks are filled with water, the sum of said first, second, third, fourth and fifth weights exceeds the sum of said first, second, third, fourth and fifth buoyant forces, whereby said bottoms of said tanks press on said bottom with pressure in the range of 0.05 to 0.50 pounds per square inch on said bottom areas.

3. The apparatus of claim 1 in which each of said forward ends of said booms is attached by one of said pivotal connections to said forward portion of said boat near said gunwale and said boom lengths exceed said boat length by an amount in the range of 10 to 50 percent of said boat length.

4. The apparatus of claim 1 in which said means for oscillating and said means for filling and emptying said tanks are mechanical/pneumatic.

5. The apparatus of claim 2 in which each of said forward ends of said booms is attached by one of said pivotal connections to said forward portion of said boat near said gunwale and said boom lengths exceed said boat length by an amount in the range of 10 to 50 percent of said boat length.

6. The apparatus of claim 3 in which said means for oscillating and said means for filling and emptying said tanks are mechanical/pneumatic.

7. The apparatus of claim 6 in which said first and second booms have first and second weights and first and second buoyant forces, said cutting assembly has a third weight and a third buoyant force and said first and second tanks have fourth and fifth weights and buoyant forces when said tanks are filled with water, the sum of said first, second, third, fourth and fifth weights exceeds the sum of said first, second, third, fourth and fifth buoyant forces, whereby said bottoms of said tanks press on said bottom with pressure in the range of 0.05 to 0.50 pounds per square inch on said bottom areas.

* * * * *